US010403264B2

(12) United States Patent
Liu

(10) Patent No.: US 10,403,264 B2
(45) Date of Patent: Sep. 3, 2019

(54) METHOD AND DEVICE FOR OUTPUTTING VOICE INFORMATION BASED ON A GEOGRAPHICAL LOCATION HAVING A MAXIMUM NUMBER OF HISTORICAL RECORDS

(71) Applicant: BAIDU ONLINE NETWORK TECHNOLOGY (BEIJING) CO., LTD., Beijing (CN)

(72) Inventor: Zhaoqing Liu, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 0 days.

(21) Appl. No.: 15/548,720

(22) PCT Filed: Dec. 4, 2015

(86) PCT No.: PCT/CN2015/096381
§ 371 (c)(1),
(2) Date: Aug. 3, 2017

(87) PCT Pub. No.: WO2017/049766
PCT Pub. Date: Mar. 30, 2017

(65) Prior Publication Data
US 2018/0018958 A1 Jan. 18, 2018

(30) Foreign Application Priority Data
Sep. 25, 2015 (CN) .......................... 2015 1 0624857

(51) Int. Cl.
G06N 5/00 (2006.01)
G06F 17/28 (2006.01)
(Continued)

(52) U.S. Cl.
CPC .......... G10L 13/08 (2013.01); G01C 21/3629 (2013.01); G06F 3/16 (2013.01);
(Continued)

(58) Field of Classification Search
CPC ........ G06F 17/289; G06N 5/04; H04M 15/50; H04M 3/493
(Continued)

(56) References Cited

U.S. PATENT DOCUMENTS 8,055,259 B1 * 11/2011 Sigg ...................... H04M 15/50
379/112.01
2007/0136068 A1 * 6/2007 Horvitz ................. G06F 17/289
704/270
(Continued)

FOREIGN PATENT DOCUMENTS

CN 101360123 (A) 1/2009
CN 101532849 (A) 9/2009
(Continued)

Primary Examiner — Farzad Kazeminezhad
(74) Attorney, Agent, or Firm — Nixon Peabody LLP

(57) ABSTRACT

A method for outputting voice information is disclosed. The method includes determining, when it is determined that to-be-processed information needs to be output in voice mode, geographical location information corresponding to the to-be-processed information according to user location information. The method also includes converting the to-be-processed information into voice information corresponding to the geographical location information according to the geographical information. The method further includes outputting the voice information in the user equipment. The solution according to the present invention is capable of automatically adjusting the dialect used by the voice information according to user needs, without manual adjustment by the user. User operations are largely simplified, a better user experience may be provided to users, and it is especially suitable for those users accustomed to using dialects.

13 Claims, 3 Drawing Sheets

(51) Int. Cl.
| | |
|---|---|
| *H04M 15/00* | (2006.01) |
| *H04M 3/493* | (2006.01) |
| *G10L 13/08* | (2013.01) |
| *G06F 3/16* | (2006.01) |
| *G10L 13/02* | (2013.01) |
| *H04W 4/02* | (2018.01) |
| *G10L 13/033* | (2013.01) |
| *G01C 21/36* | (2006.01) |
| *G06N 5/04* | (2006.01) |
| *G01S 19/42* | (2010.01) |

(52) U.S. Cl.
CPC ............ *G06F 3/167* (2013.01); *G10L 13/02* (2013.01); *G10L 13/033* (2013.01); *H04W 4/02* (2013.01); *G01S 19/42* (2013.01); *G06F 17/289* (2013.01); *G06N 5/04* (2013.01); *H04M 3/493* (2013.01); *H04M 15/50* (2013.01)

(58) Field of Classification Search
USPC ..................................................... 704/270, 2
See application file for complete search history.

(56) References Cited

U.S. PATENT DOCUMENTS

| | | | |
|---|---|---|---|
| 2007/0136222 A1* | 6/2007 | Horvitz | G06N 5/04 706/45 |
| 2007/0257888 A1 | 11/2007 | Chan | |
| 2009/0024394 A1 | 1/2009 | Nakashima et al. | |
| 2010/0056876 A1 | 3/2010 | Ellis | |
| 2011/0313767 A1 | 12/2011 | Duffield | |
| 2013/0030789 A1 | 1/2013 | Dalce | |
| 2014/0122053 A1* | 5/2014 | Lotan | H04M 3/493 704/2 |

FOREIGN PATENT DOCUMENTS

| | | |
|---|---|---|
| CN | 103117825 (A) | 5/2013 |
| CN | 103455233 A | 12/2013 |
| JP | 2005-198065 A | 7/2005 |
| JP | 2014-195226 A | 10/2014 |
| JP | 2015-158573 A | 9/2015 |
| KR | 10-2007-0044545 A | 4/2007 |
| WO | WO 02/067449 A2 | 8/2002 |

* cited by examiner

| Geographical Location | Output times | Most recent output time |
|---|---|---|
| Tianjin | 15 | 2015-06-22 |
| Beijing | 8 | 2015-06-30 |
| Shanghai | 2 | 2015-06-25 |
| Chongqing | 1 | 2015-05-01 |

Fig. 3

METHOD AND DEVICE FOR OUTPUTTING VOICE INFORMATION BASED ON A GEOGRAPHICAL LOCATION HAVING A MAXIMUM NUMBER OF HISTORICAL RECORDS

CROSS REFERENCE TO RELATED APPLICATIONS

This application is a national phase of PCT/CN2015/096381, filed Dec. 4, 2015, which claims priority to Chinese Patent Application Serial No. 201510624857.5, filed Sep. 25, 2015, entitled "Method and Device for Outputting Voice Information", the contents of which are incorporated herein by reference in its entirety.

FIELD OF THE INVENTION

The present invention relates to the field of computers, and more specifically relates to a method and device for outputting voice information.

BACKGROUND OF THE INVENTION

In the prior art, a user equipment usually provides voice services for a user, such as reading novels, weather forecast, voice question and answer, etc. However, currently the user equipment only provides standard voice services in Mandarin mode, such that voice outputs for the same content in different user equipment are completely identical.

Presently, there exist some applications that support reading in dialects. However, in such applications, before starting a reading, a user has to manually set a dialect to be used/adopted for the reading. Moreover, when the user wants to change the dialect adopted in the reading, he/she has to again manually set the change in the applications. This brings great inconvenience to the user.

SUMMARY OF THE INVENTION

An objective of the present invention is to provide a method and device for outputting voice information.

According to one embodiment of an aspect the present invention, there is provided a method for outputting voice information, comprising:

determining, when it is determined that to-be-processed information needs to be output in voice mode, geographical location information corresponding to the to-be-processed information according to user location information;

converting the to-be-processed information into voice information corresponding to the geographical location information according to the geographical information; and outputting the voice information in a user equipment.

According to an embodiment of another aspect of the present invention, there is provided a device for outputting voice information, comprising:

a determining module configured to determine, when it is determined that to-be-processed information needs to be output in voice mode, geographical location information corresponding to the to-be-processed information according to user location information;

a converting module configured to convert the to-be-processed information into voice information corresponding to the geographical location information according to the geographical information; and an outputting module configured to output the voice information in a user equipment.

Compared with the prior art, the present invention has the following advantages: 1) capable of determining geographical location information corresponding to to-be-processed information according to user location information, so as to convert the to-be-processed information into voice information corresponding to the geographical location information; and output the voice information, thereby enabling automatic adjustment of the dialect adopted/used by the voice information according to user needs, without manual adjustment by the user. Moreover, user operations are largely simplified, a better user experience can be provided to the user, and it is especially suitable for those users accustomed to using dialects; 2) the user location information includes the user's current location and resident location, avoiding the situation that the user is unfamiliar with the dialect of the current location; in this way, it may be implemented to output voice based on the dialect desired by the user or familiar to the user; and 3) capable of determining the geographical location information based on factors such as location priority information, historical voice records or location indication information from the user, so as to output voice information to the user's satisfaction more accurately.

BRIEF DESCRIPTION OF THE ACCOMPANYING DRAWINGS

Other features, objectives, and advantages will become more apparent by reading the following detailed depiction of the non-limiting embodiments with reference to the accompanying drawings, in which:

FIG. 3 shows a chart of exemplary historical voice records according to an embodiment of the present invention.

In the drawings, same or similar reference numerals represent same or similar parts.

DETAILED DESCRIPTION OF THE PREFERRED EMBODIMENTS

Hereinafter, the present invention will be described in further detail with reference to the accompanying drawings.

Figure 1:
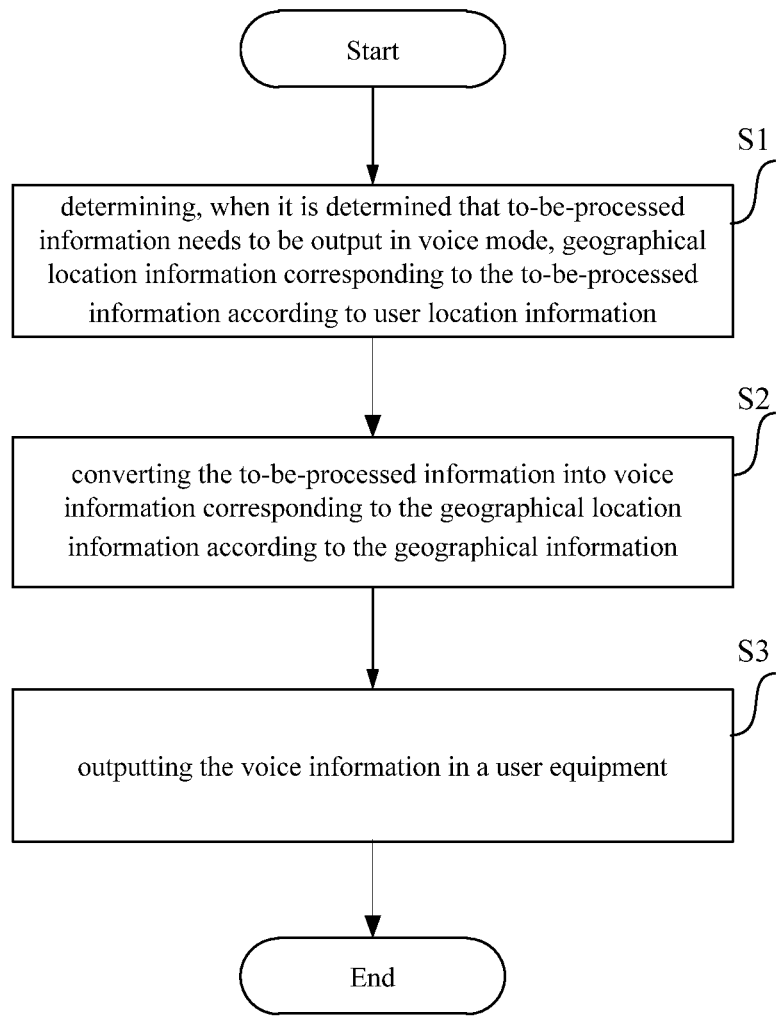
FIG. 1 shows a flow diagram of a method for outputting voice information according to an embodiment of the present invention.

FIG. 1 shows a flow diagram of a method for outputting voice information according to an embodiment of the present invention.

Particularly, the method of the present embodiment is mainly implemented through a user equipment. The user equipment includes, but is not limited to, a PC, a tablet computer, a smart phone, a PDA, an IPTV, etc.

It needs to be noted that the user equipment is only exemplary; other existing or future user equipment, if applicable to the present invention, should also be included within the scope of the present invention, and which are incorporated herein by reference.

The method according to the present embodiment comprises step S1, step S2 and step S3.

In step S1 the user equipment determines, when it is determined that to-be-processed information needs to be output in voice mode, geographical location information corresponding to the to-be-processed information according to user location information.

Particularly, the to-be-processed information is for indicating information that needs output processing. Preferably, the to-be-processed information includes, but is not limited to: information read locally from the user equipment, information obtained by the user equipment from a network device, etc. Particularly, the to-be-processed information may be embodied into a plurality of types, e.g., text type information (e.g., textual content of a novel), voice type information (e.g., weather forecast broadcast by standard Mandarin), etc.

Particularly, the user equipment may determine a need for adopting/using voice mode to output the to-be-processed information in a plurality of situations.

For example, when the user equipment obtains the information inputted by the user in voice mode, the user equipment determines outputting the to-be-processed information in voice mode.

For another example, the user equipment determines a need for using voice mode to output the to-be-processed information according to the output mode set by the user in the user equipment.

For a further example, the user equipment determines using voice mode to output the to-be-processed information based on an indication of the user in the currently active application. For example, a user starts application APP1 for reading in a user equipment and clicks on "voice reading" in the APP1, the user equipment determines using voice mode to read the textual content designated by the user according to the user's click operation.

Particularly, the user location information includes, but is not limited to, any information associated with the user's location. Preferably, the user location information includes, but is not limited to, at least one of the following:

1) current location information for indicating the current location of the user.

Particularly, the current location information includes any information for indicating the current location of the user using the user equipment, e.g., the name or mark of the city where the user is currently located, the altitude and latitude where the user is currently located, etc.

Particularly, the user equipment may employ a plurality of techniques to obtain the user's current location information. For example, the user positions the user equipment based on the GPS (Global Positioning System) to obtain the current location information, the current location information being for indicating the current location of the user equipment. For another example, the user equipment directly obtains the current location information based on the current location inputted by the user in the user equipment; and 2) resident location information for indicating a resident location of the user.

Particularly, the resident location information includes any information for indicating the resident location of the user using the user equipment. Preferably, the resident location information includes, but is not limited to: the name or mark of the city where the user is frequently located, etc.; more preferably, when the user has a plurality of resident locations, the resident location information also comprises priority sequence of the plurality of resident locations (e.g., the longer the residing time corresponding to the resident location or the more the residing time is, the higher the priority of the resident location is).

Particularly, the user equipment may obtain the resident location information of the user using a plurality of techniques. For example, the attribution of the user equipment is Shanghai, then the user equipment determines resident location information of the user, the resident location information indicating that the resident location of the user is Shanghai. For another example, the user equipment determines the resident location information of the user according to roaming records of the user equipment, the resident location information indicating that the city where the user roams most frequently is Beijing. For a further example, the user sets its resident location in the user equipment to Beijing and Tianjin, then the user equipment determines the resident location information of the user according to the setting, the locations indicated by the resident location information being Beijing and Tianjin.

It should be noted that the user location information above is only exemplary; those skilled in the art should understand that any information associated with the user's location should be included within the scope of the user location information of the present invention.

Particularly, the geographical location information includes any information for indicating the geographical location corresponding to the to-be-processed information. Preferably, the geographical location information includes, but is not limited to: name or mark of the geographical location corresponding to the to-be-processed information.

Specifically, the implementation technique in which the user equipment determines, when it is determined that to-be-processed information needs to be output in voice mode, geographical location information corresponding to the to-be-processed information according to user location information, includes, but is not limited to:

1) The user equipment determines, when it is determined to output the to-be-processed information in voice mode, the geographical location information corresponding to the to-be-processed information according to user location information and location priority information.

Particularly, the location priority information includes any information related to the priority of the user's location; preferably, the location priority information includes, but is not limited to: information for indicating priority between location types (e.g., current location, resident location), and information for indicating priority between specific geographical locations. It needs to be noted that the user equipment may obtain the location priority information using a plurality of techniques. For example, the user equipment obtains location priority information for the user according to the user's setting of the priorities of the plurality of geographical locations. In another example, the user equipment obtains the location priority information for the user using the user equipment according to the times of each geographical location being used.

As an example of the present embodiment, the user location information indicates that the current location of the user is "Shanghai" and the resident location of the user is "Beijing"; the location priority information for the user indicates that the priority of the current location is higher than the resident location; then when it is determined that the to-be-processed information needs to be outputted in voice mode, the user equipment determines the geographical location information corresponding to the to-be-processed information according to the user location information and the location priority information, i.e., the geographical location indicated by the geographical location information being the current location "Shanghai".

As another example of the present embodiment, the user location information indicates that the current location of the user is "Shanghai" and the resident locations of the user include "Beijing" and "Tianjin"; the location priority information for the user indicates: the priority of "Tianjin" is higher than "Beijing"; the priority of "Beijing" is higher than "Shanghai"; then when it is determined that the to-be-processed information needs to be outputted in voice mode, the user equipment determines the geographical location information corresponding to the to-be-processed information according to the user location information and the location priority information, the geographical location indicated by the geographical location information being "Tianjin" which has the highest priority.

2) The user equipment determines, when it is determined that the to-be-processed information needs to be outputted in voice mode, the geographical location information corresponding to the to-be-processed information according to the user location information and historical voice records in the user equipment.

Particularly, the historical voice records include any record information associated with the voice information historically outputted by the user equipment. Preferably, the historical voice records include, but are not limited to: time of each historical voice output, geographical location corresponding to each historical voice output, output times corresponding to each geographical location, and most recent output time corresponding to each geographical location, etc.

As an example of the present embodiment, the user location information indicates that the current location of the user is "Shanghai," and the resident locations of the user include "Beijing" and "Tianjin". FIG. 3 is a schematic diagram of exemplary historical voice records according to the present invention. When it is determined that the to-be-processed information needs to be outputted in voice mode, the user equipment determines geographical location information corresponding to the to-be-processed information according to the user location information and the historical voice records, the geographical location information indicating the geographical location "Beijing" corresponding to the most recent voice output.

As another example of the present embodiment, the user location information indicates that the current location of the user is "Shanghai" and the resident locations of the user include "Beijing" and "Tianjin". FIG. 3 is a schematic diagram of exemplary historical voice records according to the present invention. When it is determined that the to-be-processed information needs to be outputted in voice mode, the user equipment determines geographical location information corresponding to the to-be-processed information according to the user location information and the historical voice records, the geographical location information indicating the geographical location "Tianjin" corresponding to the most output times.

As a further example of the present embodiment, when the user equipment determines according to the historical voice records that no voice output was ever performed based on the current location indicated by the user location information, the geographical location information determined by the user equipment indicates the current location. When the user equipment determines according to the historical voice records that no voice input was ever performed based on the current location indicated by the user location information, the user equipment selects one geographical location from the historical voice records as the geographical location indicated by the geographical location information.

3) The user equipment determines, when it is determined that the to-be-processed information needs to be outputted in voice mode, the geographical location information corresponding to the voice mode according to the user location information and the location indication information from the user.

Particularly, the location indication information includes any information indicating the user's indication of the geographical location. Preferably, the location indication information includes, but is not limited to: location type indicated by the user, specific geographical location indicated by the user, etc. Particularly, the user equipment may obtain the location indication information from the user using a plurality of techniques. For example, the user sets "Always Adopt/Use the Current Location" in the user equipment, then the user equipment obtains the location indication information from the user based on the user's settings, the location indication information indicating that the location type as indicated is the current location. In another example, the user equipment presents a plurality of locations indicated by the user location information to the user, and determines the user's location indication information according to the user's selection operation with respect to the plurality of locations, the location indication information indicating the location selected by the user from among the plurality of locations.

As an example of the present embodiment, the user location information indicates that the current location of the user is "Shanghai" and the resident locations of the user include "Beijing" and "Tianjin." The user equipment presents the following 3 geographical locations for selection in the user equipment: Shanghai, Beijing, Tianjin. Afterwards, the user equipment determines the location indication information from the user according to the user's selection operation with respect to the 3 geographical locations, the location indication information indicating that the geographical location selected by the user is "Shanghai."

It needs to be noted that the examples above are only for better illustrating the technical solution of the present invention, rather than limiting the present invention. Those skilled in the art should understand any implementation technique, in which the user equipment determines, when it is determined that the to-be-processed information needs to be outputted in voice mode, geographical location information corresponding to the to-be-processed information according to user location information, should be included within the scope of the present invention.

In step S2, the user equipment converts the to-be-processed information into voice information corresponding to the geographical location information according to the geographical information.

Specifically, the user equipment converts the to-be-processed information into voice information corresponding to the geographical location information based on a voice packet corresponding to the geographical location information.

For example, when the geographical location indicated by the geographical location information corresponding to the to-be-processed information is "Shanghai"; the user equipment converts the to-be-processed information into voice information using Shanghai dialect based on a voice packet corresponding to Shanghai dialect.

It needs to be noted that the example above is only for better illustrating the technical solution of the present invention, not for limiting the present invention. Those skilled in the art should understand that any implementing technique of converting the to-be-processed information into voice information corresponding to the geographical location information according to the geographical information, should be included within the scope of the present invention.

In step S3, the user equipment outputs the voice information in the user equipment.

Specifically, the user equipment outputs the voice information in the user equipment in voice mode.

For example, a user inputs the voice "weather" in a user equipment in voice mode, the user equipment obtains to-be-processed information "Sunny, 22°-31°" of a textual type corresponding to the "weather"; in step S1. The user equipment determines, when it is determined that the to-be-processed information is outputted in voice mode, the geographical location information corresponding to the to-be-processed information according to user location information, the geographical location information indicating the current location "Shanghai". In step S2, the user equipment converts the to-be-processed information into voice information of Shanghai dialect based on the voice packet corresponding to Shanghai dialect. In step S3, the user equipment outputs the voice information of Shanghai dialect in the user equipment.

It needs to be noted that the example above is only for better illustrating the technical solution of the present invention, rather than limiting the present invention. Those skilled in the art should understand that any implementation technique of outputting the voice information in a user equipment, should be included within the scope of the present invention.

The solution according to the present embodiment is capable of determining geographical location information corresponding to the to-be-processed information according to user location information, so as to convert the to-be-processed information into voice information corresponding to the geographical location information and output the voice information, thereby enabling automatic adjustment of the dialect adopted by the voice information according to user needs, without manual adjustment by the user, user operations are largely simplified. Thus, a better user experience can be provided to users, and it is especially suitable for those users accustomed to using dialects. The user location information includes the user's current location and resident location, avoiding the situation that the user is unfamiliar with the dialect of the current location. In this way, it may be implemented to output voice based on the dialect desired by the user or familiar to the user. In addition, it is capable of determining the geographical location information based on factors such as location priority information, historical voice records or location indication information from the user, so as to output voice information to the user's satisfaction more accurately.

Figure 2:
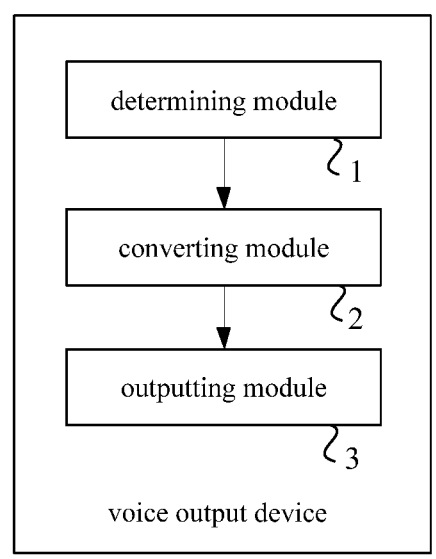
FIG. 2 shows a block diagram of a device for outputting voice information according to an embodiment of the present invention.

FIG. 2 is a structural diagram of a device for outputting voice information according to an embodiment of the present invention. The device for outputting voice information (hereinafter referred to as "voice output device") includes a determining module 1, a converting module 2 and an outputting module 3.

The determining module 1 determines, when it is determined that to-be-processed information needs to be output in voice mode, geographical location information corresponding to the to-be-processed information according to user location information.

Particularly, the to-be-processed information is for indicating information that needs output processing. Preferably, the to-be-processed information includes, but is not limited to: information read locally from the user equipment, information obtained by the user equipment from a network device. Particularly, the to-be-processed information may be embodied into a plurality of types, e.g., text type information (e.g., textual content of a novel), voice type information (e.g., weather forecast broadcast by standard Mandarin), etc.

Particularly, the determining module 1 may determine a need of adopting voice mode to output the to-be-processed information in a plurality of situations.

For example, when the user equipment obtains the information inputted by the user in voice mode, the determining module 1 determines outputting the to-be-processed information in voice mode.

For another example, the determining module 1 determines a need of adopting voice mode to output the to-be-processed information according to the output mode set by the user in the user equipment.

For a further example, the determining module 1 determines adopting voice mode to output the to-be-processed information based on an indication of the user in the currently active application; for example, a user starts application APP1 for reading in a user equipment and clicks onto "voice reading" in the APP1, the determining module 1 determines adopting voice mode to read the textual content designated by the user according to the user's click operation.

Particularly, the user location information includes, but is not limited to, any information associated with the user's location. Preferably, the user location information includes, but is not limited to:

1) current location information for indicating the current location of the user.

Particularly, the current location information includes any information for indicating the current location of the user using the user equipment, e.g., the name or mark of the city where the user is currently located, the altitude and latitude where the user is currently located, etc.

Particularly, the determining module 1 may adopt a plurality of techniques to obtain the user's current location information. For example, the determining module 1 positions the user equipment based on the GPS (Global Positioning System) to obtain the current location information, the current location information being for indicating the current location of the user equipment. For another example, the determining module 1 directly obtains the current location information based on the current location inputted by the user in the user equipment.

2) resident location information for indicating a resident location of the user.

Particularly, the resident location information includes any information for indicating the resident location of the user using the user equipment. Preferably, the resident location information includes, but is not limited to: the name or mark of the city where the user is frequently located, etc. More preferably, when the user has a plurality of resident locations, the resident location information also comprises priority sequence of the plurality of resident locations (e.g., the longer the residing time corresponding to the resident location or the more the residing time is, the higher the priority of the resident location is).

Particularly, the determining module 1 may obtain the resident location information of the user using a plurality of techniques. For example, the number attribution of the user equipment is Shanghai, then the determining module 1 determines resident location information of the user, the resident location information indicating that the resident location of the user is Shanghai. For another example, the user equipment determines the resident location information of the user according to roaming records of the user equipment, the resident location information indicating that the city where the user roams most frequently is Beijing. For a further example, the user sets its resident location in the user equipment to Beijing and Tianjin, then the determining module 1 determines the resident location information of the user according to the setting, the locations indicated by the resident location information being Beijing and Tianjin.

It should be noted that the user location information above is only exemplary. Those skilled in the art should understand that any information associated with the user's location should be included within the scope of the user location information of the present invention.

Particularly, the geographical location information includes any information for indicating the geographical location corresponding to the to-be-processed information. Preferably, the geographical location information includes, but is not limited to: name or mark of the geographical location corresponding to the to-be-processed information.

Specifically, the implementation technique, in which the user equipment determines, when it is determined that to-be-processed information needs to be output in voice mode, geographical location information corresponding to the to-be-processed information according to user location information, includes, but is not limited to:

1) The determining module 1 further comprises a first sub-determining module (not shown). The first sub-determining module determines, when it is determined to output the to-be-processed information in voice mode, the geographical location information corresponding to the to-be-processed information according to user location information and location priority information.

Particularly, the location priority information includes any information related to the priority of the user's location. Preferably, the location priority information includes, but is not limited to: information for indicating priority between location types (e.g., current location, resident location), and information for indicating priority between specific geographical locations. It needs to be noted that the first sub-determining module may obtain the location priority information using a plurality of techniques. For example, the first sub-determining module obtains location priority information for the user according to the user's setting of the priorities of the plurality of geographical locations. For another example, the first sub-determining module obtains the location priority information for the user using the user equipment according to the times of each geographical location being adopted.

As an example of the present embodiment, the user location information indicates that the current location of the user is "Shanghai" and the resident location of the user is "Beijing". The location priority information for the user indicates that the priority of the current location is higher than the resident location. Then, when it is determined that the to-be-processed information needs to be outputted in voice mode, the first sub-determining module determines the geographical location information corresponding to the to-be-processed information according to the user location information and the location priority information, the geographical location indicated by the geographical location information being the current location "Shanghai".

As another example of the present embodiment, the user location information indicates that the current location of the user is "Shanghai" and the resident locations of the user include "Beijing" and "Tianjin". The location priority information for the user indicates: the priority of "Tianjin" is higher than "Beijing"; and the priority of "Beijing" is higher than "Shanghai". Then, when it is determined that the to-be-processed information needs to be outputted in voice mode, the first sub-determining module determines the geographical location information corresponding to the to-be-processed information according to the user location information and the location priority information, the geographical location indicated by the geographical location information being "Tianjin" which has the highest priority.

2) The determining module 1 further comprises a second sub-determining module (not shown). The second sub-determining module determines, when it is determined that the to-be-processed information needs to be outputted in voice mode, the geographical location information corresponding to the to-be-processed information according to the user location information and historical voice records in the user equipment.

Particularly, the historical voice records include any record information associated with the voice information historically outputted by the user equipment. Preferably, the historical voice records include, but is not limited to: time of each historical voice output, geographical location corresponding to each historical voice output, output times corresponding to each geographical location, and most recent output time corresponding to each geographical location, etc.

As an example of the present embodiment, the user location information indicates that the current location of the user is "Shanghai," and the resident locations of the user include "Beijing" and "Tianjin". FIG. 3 is a schematic diagram of an exemplary historical voice records according to the present invention. When it is determined that the to-be-processed information needs to be outputted in voice mode, the second sub-determining module determines geographical location information corresponding to the to-be-processed information according to the user location information and the historical voice records, the geographical location information indicating the geographical location "Beijing" corresponding to the most recent voice output.

As another example of the present embodiment, the user location information indicates that the current location of the user is "Shanghai" and the resident locations of the user include "Beijing" and "Tianjin". FIG. 3 is a schematic diagram of an exemplary historical voice records according to the present invention. When it is determined that the to-be-processed information needs to be outputted in voice mode, the second sub-determining module determines geographical location information corresponding to the to-be-processed information according to the user location information and the historical voice records, the geographical location information indicating the geographical location "Tianjin" corresponding to the most output times.

As a further example of the present embodiment, when the second sub-determining module determines according to the historical voice records that voice output was ever performed based on the current location indicated by the user location information, the geographical location information determined by the second sub-determining module indicates the current location. When the second sub-determining module determines according to the historical voice records that no voice input was ever performed based on the current location indicated by the user location information, the second sub-determining module selects one geographical location from the historical voice records as the geographical location indicated by the geographical location information.

3) The determining module 1 further comprises a third sub-determining module (not shown). The third sub-determining module determines, when it is determined that the to-be-processed information needs to be outputted in voice mode, the geographical location information corresponding to the voice mode according to the user location information and the location indication information from the user.

Particularly, the location indication information includes any information indicating the user's indication of the geographical location. Preferably, the location indication information includes, but is not limited to: location type indicated by the user, specific geographical location indicated by the user, etc. Particularly, the third sub-determining module may obtain the location indication information from the user using a plurality of techniques. For example, the user sets "Always Adopt the Current Location" in the user equipment, then the third sub-determining module obtains the location indication information from the user based on the user's settings, the location indication information indicating that the location type as indicated is the current location. For another example, the third sub-determining module presents a plurality of locations indicated by the user location information to the user, and determines the user's location indication information according to the user's selection operation with respect to the plurality of locations, the location indication information indicating the location selected by the user from among the plurality of locations.

As an example of the present embodiment, the user location information indicates that the current location of the user is "Shanghai" and the resident locations of the user include "Beijing" and "Tianjin." The third sub-determining module presents the following 3 geographical locations for selection in the user equipment: Shanghai, Beijing, Tianjin. Afterwards, the third sub-determining module determines the location indication information from the user according to the user's selection operation with respect to the 3 geographical locations, the location indication information indicating that the geographical location selected by the user is "Shanghai."

It needs to be noted that the examples above are only for better illustrating the technical solution of the present invention, rather than limiting the present invention. Those skilled in the art should understand any implementation technique, in which the user equipment determines, when it is determined that the to-be-processed information needs to be outputted in voice mode, geographical location information corresponding to the to-be-processed information according to user location information, should be included within the scope of the present invention.

The converting module 2 converts the to-be-processed information into voice information corresponding to the geographical location information according to the geographical information.

Specifically, the converting module 2 converts the to-be-processed information into voice information corresponding to the geographical location information based on a voice packet corresponding to the geographical location information.

For example, the geographical location indicated by the geographical location information corresponding to the to-be-processed information is "Shanghai". The converting module 2 converts the to-be-processed information into voice information adopting Shanghai dialect based on a voice packet corresponding to Shanghai dialect.

It needs to be noted that the example above is only for better illustrating the technical solution of the present invention, not for limiting the present invention. Those skilled in the art should understand that any implementing technique of converting the to-be-processed information into voice information corresponding to the geographical location information according to the geographical information, should be included within the scope of the present invention.

The outputting module 3 outputs the voice information in the user equipment.

Specifically, the outputting module 3 outputs the voice information in the user equipment in voice mode.

For example, a user inputs the voice "weather" in a user equipment in voice mode, the user equipment obtains to-be-processed information "Sunny, 22°-31°" of a textual type corresponding to the "weather". The determining module 1 determines, when it is determined that the to-be-processed information is outputted in voice mode, the geographical location information corresponding to the to-be-processed information according to user location information, the geographical location information indicating the current location "Shanghai". The converting module 2 converts the to-be-processed information into voice information of Shanghai dialect based on the voice packet corresponding to Shanghai dialect. The outputting module 3 outputs the voice information of Shanghai dialect in the user equipment.

It needs to be noted that the example above is only for better illustrating the technical solution of the present invention, rather than limiting the present invention. Those skilled in the art should understand that any implementation technique of outputting the voice information in a user equipment, should be included within the scope of the present invention.

The solution according to the present embodiment is capable of determining geographical location information corresponding to the to-be-processed information according to user location information, so as to convert the to-be-processed information into voice information corresponding to the geographical location information and output the voice information, thereby enabling automatic adjustment of the dialect adopted by the voice information according to user needs, without manual adjustment by the user. Thus, user operations are largely simplified, a better user experience can be provided to users, and it is especially suitable for those users accustomed to using dialects. The user location information includes at least one of the user's current location and resident location, avoiding the situation that the user is unfamiliar with the dialect of the current location. In this way, it may be implemented to output voice based on the dialect desired by the user or familiar to the user. In addition, it is capable of determining the geographical location information based on factors such as location priority information, historical voice records or location indication information from the user, so as to output voice information to the user's satisfaction more accurately.

It should be noted that the present invention may be implemented in software and/or a combination of software and hardware. For example, respective modules in the present invention may be implemented by ASIC (Application Specific Integrated Circuit) or any other similar hardware device. In one embodiment, the software program of the present invention may be executed through the processor to implement the steps or functions as aforesaid. Likewise, a software program (including relevant data structure) of the present invention may be stored in a computer readable recording medium, e.g., RAM (random access memory) memory, magnetic or optical driver or a floppy disk, and a similar device. In addition, some steps or functions of the present invention may be implemented by hardware, e.g., as a circuit cooperating with the processor to execute various steps or functions.

To those skilled in the art, it is apparent that the present invention is not limited to the details of the above exemplary embodiments, and the present invention may be implemented with other forms without departing from the spirit or basic features of the present invention. Thus, in any way, the embodiments should be regarded as exemplary, not limitative; the scope of the present invention is limited by the appended claims, instead of the above description. Thus, all variations intended to fall into the meaning and scope of equivalent elements of the claims should be covered within the present invention. No reference signs in the claims should be regarded as limiting the involved claims. It is apparent that the term "comprise/comprising/include/including" does not exclude other units or steps, and reference to a singularity does not exclude a plurality. A plurality of units or means stated in the apparatus claims may also be implemented by a single unit or means through software or hardware. Terms such as the first and the second are used to indicate names, but do not indicate any particular sequence.

The invention claimed is:

1. A method for outputting voice information, comprising:
determining, by a user equipment comprising a processor and a memory when the user equipment determines according to a user operation that to-be-processed information needs to be output in voice mode, geographical location information corresponding to the to-be-processed information according to user location information and historical voice records in the user equipment, the historical voice records comprising geographical locations corresponding to historical voice outputs and respective numbers of the historical voice outputs in the geographical locations, the determined geographical location information corresponding to the to-be-processed information being the geographical location having a maximum one of the numbers in the historical voice records;
converting, by the user equipment, the to-be-processed information into voice information with a language type corresponding to the geographical location information according to the geographical information, the user equipment comprising language types corresponding to different geographical locations;
outputting the voice information in the user equipment.

2. The method according to claim 1, wherein the user location information includes:
current location information for indicating current location of a user; and
resident location information for indicating a resident location of the user.

3. The method according to claim 2, wherein the resident location is a city where the user equipment roams most frequently.

4. The method according to claim 2, wherein the resident location information of the user is determined according to roaming records of the user equipment.

5. The method according to claim 1, wherein the step of determining, when the user equipment determines according to a user operation that to-be-processed information needs to be output in voice mode, geographical location information corresponding to the to-be-processed information according to user location information and historical voice records in the user equipment comprises:
determining, when the user equipment determines according to a user operation that to-be-processed information needs to be output in voice mode, geographical location information corresponding to the to-be-processed information according to user location information, historical voice records in the user equipment and location priority information.

6. The method according to claim 1, wherein the step of determining, when the user equipment determines according to a user operation that to-be-processed information needs to be output in voice mode, geographical location information corresponding to the to-be-processed information according to user location information and historical voice records in the user equipment comprises:
determining, when the user equipment determines according to a user operation that to-be-processed information needs to be output in voice mode, geographical location information corresponding to the to-be-processed information according to user location information, historical voice records in the user equipment and location indication information from the user.

7. The method according to claim 1, wherein historical voice records comprise output times corresponding to each geographical location.

8. The method according to claim 1, wherein historical voice records comprise most recent output time corresponding to each geographical location.

9. A device for outputting voice information, the device comprising:
at least one processor; and
a memory storing instructions, the instructions when executed by the at least one processor, cause the at least one processor to perform operations, the operations comprising:
determining, when the processor determines according to a user operation that to-be-processed information needs to be output in voice mode, geographical location information corresponding to the to-be-processed information according to user location information and historical voice records in the device, the historical voice records comprising geographical locations corresponding to historical voice outputs and respective numbers of the historical voice outputs in the geographical locations, the determined geographical location information corresponding to the to-be-processed information being the geographical location having a maximum one of the numbers in the historical voice records;
converting the to-be-processed information into voice information with a language type corresponding to the geographical location information according to the geographical information, the device comprising language types corresponding to different geographical locations;
outputting the voice information in the device.

10. The device according to claim 9, wherein the user location information includes
current location information for indicating current location of a user; and
resident location information for indicating a resident location of a user.

11. The device according to claim 9, wherein the determining, when the processor determines according to a user operation that to-be-processed information needs to be output in voice mode, geographical location information corresponding to the to-be-processed information according to user location information and historical voice records in the user equipment comprises:
determining, when the processor determines according to the user operation that to-be-processed information needs to be output in voice mode, geographical location information corresponding to the to-be-processed information according to user location information, historical voice records in the user equipment and location priority information.

12. The device according to claim 9, wherein the determining, when the processor determines according to a user operation that to-be-processed information needs to be output in voice mode, geographical location information corresponding to the to-be-processed information according to user location information and historical voice records in the user equipment comprises:

determining, when the processor determines according to the user operation that to-be-processed information needs to be output in voice mode, geographical location information corresponding to the to-be-processed information according to user location information, historical voice records in the user equipment and location indication information from the user.

13. A non-transitory computer storage medium storing a computer program, which when executed by a computer device, causes the computer device to perform the following operations:

determining, when the computer device determines that to-be-processed information needs to be output in voice mode, geographical location information corresponding to the to-be-processed information according to user location information and historical voice records in the computer device, the historical voice records comprising geographical locations corresponding to historical voice outputs and respective numbers of the historical voice outputs in the geographical locations, the determined geographical location information corresponding to the to-be-processed information being the geographical location having a maximum one of the numbers in the historical voice records;

converting the to-be-processed information into voice information with a language type corresponding to the geographical location information according to the geographical information, the computer device comprising language types corresponding to different geographical locations; and outputting the voice information in the computer device.

* * * * *